US007815042B2

(12) United States Patent
Oishi

(10) Patent No.: US 7,815,042 B2
(45) Date of Patent: Oct. 19, 2010

(54) BELT DRIVING APPARATUS, FIXING APPARATUS, AND IMAGE FORMING APPARATUS

(75) Inventor: Noboru Oishi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 24 days.

(21) Appl. No.: 11/219,829

(22) Filed: Sep. 7, 2005

(65) Prior Publication Data

US 2006/0054467 A1 Mar. 16, 2006

(30) Foreign Application Priority Data

Sep. 8, 2004 (JP) ............................ 2004-260448

(51) Int. Cl.
*B65G 39/10* (2006.01)
*G03G 15/00* (2006.01)
*G03G 15/16* (2006.01)

(52) U.S. Cl. ....................... 198/837; 198/840; 399/329; 399/162; 399/303; 399/313

(58) Field of Classification Search ................. 198/835, 198/837, 840; 399/103, 303, 299
See application file for complete search history.

(56) References Cited

U.S. PATENT DOCUMENTS 3,973,446 A 8/1976 Vasilantone
4,561,757 A * 12/1985 Salomon et al. ............. 399/165
4,986,413 A * 1/1991 Mraz .......................... 198/839
5,017,969 A * 5/1991 Mitomi et al. .............. 399/299
5,410,389 A * 4/1995 Poehlein ..................... 399/165
5,626,337 A * 5/1997 Iseki .......................... 271/198
5,659,851 A 8/1997 Moe et al.
5,896,979 A * 4/1999 Hokari et al. ............... 198/807
6,053,832 A * 4/2000 Saito .......................... 474/122
6,088,558 A * 7/2000 Yamada et al. .............. 399/165
6,088,566 A 7/2000 Todome
6,501,936 B1 * 12/2002 Sato ........................... 399/329
6,505,023 B2 * 1/2003 Miyamoto .................. 399/237
6,505,026 B2 * 1/2003 Hayakawa et al. .......... 399/303
6,871,036 B2 * 3/2005 Asuwa et al. ............... 399/302
2003/0127173 A1 7/2003 Kamiya et al.
2003/0175045 A1 * 9/2003 Hara .......................... 399/176
2004/0067081 A1 4/2004 Kasahara

FOREIGN PATENT DOCUMENTS

DE 31 38755 A1 5/1982
EP 1 253 483 A1 10/2002
JP 05001751 1/1993
JP 11-065336 3/1999

* cited by examiner

*Primary Examiner*—Gene Crawford
*Assistant Examiner*—Kavel P Singh
(74) *Attorney, Agent, or Firm*—Rabin & Berdo, P.C.

(57) ABSTRACT

A belt driving apparatus is constructed so that the edge portion of a belt will not run over a stopper or be damaged. A belt is entrained about a plurality of rollers. A drive source is coupled to at least one of the plurality of rollers. The drive source drives the at least one of the plurality of rollers in rotation. A restriction member is provided in the vicinity of at least one longitudinal end portion of at least one of the plurality of rollers. The restriction member prevents the belt from moving outwardly in a longitudinal direction of the at least one of the plurality of rollers and preventing the belt from moving outwardly in a radial direction of the at least one of the plurality of rollers.

23 Claims, 5 Drawing Sheets

BELT DRIVING APPARATUS, FIXING APPARATUS, AND IMAGE FORMING APPARATUS

BACKGROUND OF THE INVENTION

1. Field of the Invention

The present invention relates to a belt driving apparatus, fixing apparatus and image forming apparatus.

2. Description of the Related Art

Among the conventional electrophotographic image forming apparatuses are printers, copying machines, and facsimile machines. For printers, a charging unit charges the entire surface of a photoconductive drum to a uniform potential. Then, an exposing unit illuminates the charged surface to form an electrostatic latent image. A developing unit develops the electrostatic latent image into a toner image. The toner image is then transferred onto a recording paper. The recording paper having the toner image thereon is then advanced to a fixing unit where the toner image is fixed into a permanent image.

The fixing unit includes a fixing roller and a pressure roller in pressure contact with the fixing roller. When the recording paper is pulled in between the fixing roller and the pressure roller, the fixing roller heats the toner image and the pressure roller presses the toner image against the recording paper. In order to increase printing speed, the amount of heat supplied to the toner image needs to be increased.

For this purpose, a belt type fixing unit has been proposed which includes a heat roller in addition to a fixing roller and a pressure roller. An endless belt is sandwiched between the fixing roller and heater roller unit. A relatively large nip is formed between the belt and pressure roller, and the heat roller and pressure roller are heated to heat the belt.

If the belt runs crooked due to dimension errors in various members, imbalance of tension applied to the belt, and non-uniform temperature distribution across the length of the fixing roller and heat roller, the edge portion of the belt will be damaged. In order to solve this problem, a flange is provided at the longitudinal ends of the heat roller and serves as a stopper that prevents the belt from shifting toward one ends of the fixing roller and heat roller.

FIG. 11 illustrates a conventional belt. FIG. 12 and FIG. 13 illustrate how the belt shifts to one side.

Referring to FIGS. 11-13, a flange 13 is disposed on one end of a heat roller 11. The heat roller 11 has flanges 13 at its longitudinal ends and the flanges 13 are rotatably supported by bearings 14. The bearing 14 is supported by a supporting frame 15. The heat roller 11 rotates in a direction shown by arrow A. A belt 12 is entrained about the heat roller 11 and runs in a direction shown by arrow B.

Referring to FIG. 12, when the belt 12 shifts toward one longitudinal end of the heat roller 11 to touch the flange 13, a frictional force is exerted on the belt 12 to cause the edge portion of the belt 12 to deform in a direction shown by arrow C at a point P1 where the belt 12 contacts the flange 13. Prolonged application of such a frictional force will eventually cause the edge portion of the belt 12 deform greatly in a radial direction of the flange as shown in FIG. 13, so that the belt runs over the flange 13 or becomes damaged.

SUMMARY OF THE INVENTION

The present invention was made in view of the aforementioned problems with the conventional printers.

An object of the invention is to provide a belt driving apparatus, a fixing apparatus, and an image forming apparatus where the edge portion of a belt will not run over a stopper or be damaged.

A belt driving apparatus is constructed so that the edge portion of a belt will not run over a stopper or be damaged. A belt is entrained about a plurality of rollers. A drive source is coupled to at least one of the plurality of rollers. The drive source drives the at least one of the plurality of rollers in rotation. A restriction member is provided in the vicinity of at least one longitudinal end portion of at least one of the plurality of rollers. The restriction member prevents the belt from moving outwardly in a longitudinal direction of the at least one of the plurality of rollers and preventing the belt from moving outwardly in a radial direction of the at least one of the plurality of rollers.

The restriction member may include a flange and a rotating member. The flange is provided at the at least one end portion of the at least one of the plurality of rollers and projects in a radial direction from the at least one of the plurality of rollers. The rotating member is supported to roll on a peripheral edge portion of the belt in the vicinity of the flange and presses the peripheral end portion of the belt against the at least one of the plurality of rollers.

The rotating member may include a shaft, a resin layer, and a heat-resistant resilient layer applied over the resin layer. The roller rolls on the peripheral edge portion of the belt. The resin layer covers the shaft. The heat-resistant resilient layer covers the resin layer.

The at least one end portion of the at least one of the plurality of rollers is rotatably received in a space formed in a stationary supporting member in such a way that the at least one end portion is movable within the space relative to the rotating member as the belt moves in the longitudinal direction.

The rotating member is formed with a tapered circumferential surface conical with respect to a rotational axis of the rotating member, the tapered circumferential surface being tapered toward a longitudinally middle portion of the at least one of the plurality of rollers.

The tapered circumferential surface 46*c* is such that the difference between a large diameter and a small diameter of the tapered circumferential surface is larger than a thickness of the belt.

The belt has a three-layer structure consisting of a base layer, a resilient layer, and a mold releasing layer, which are layered in this order from an inner layer of the belt to an outer layer.

Another belt driving apparatus is constructed so that the edge portion of a belt will not run over a stopper or be damaged. A belt is entrained about a plurality of rollers. A drive source is coupled to at least one of said plurality of rollers, said drive source driving the at least one of said plurality of rollers in rotation. A rotating member is rotatably supported on a stationary supporting member and rolls on an outer circumferential surface of the at least one of the plurality of rollers. The rotating member has a tapered circumferential surface that is conical with respect to a rotational axis of the rotating member. The tapered circumferential surface is tapered toward a longitudinally middle portion of the at least one of the plurality of rollers. An urging member urges the at least one of the plurality of rollers toward the rotating member. The at least one end portion of the at least one of the plurality of rollers is rotatably received in a space formed in the stationary supporting member in such a way that the at least one end portion is movable within the space relative to the rotating member as the belt moves in the longitudinal direction.

The tapered circumferential surface forms an angle in the range of 30 to 45 degrees with a rotational axis of the at least one of the plurality of rollers.

The belt has a thickness in the rage of 0.3 to 1.0 mm.

The belt has a thickness in the rage of 0.5 to 1.0 mm.

The rotating member includes a flange that projects radially from the rotating member and rotates in contact with an end surface of the at least one of the plurality of rollers.

A fixing apparatus incorporates the aforementioned belt driving apparatus.

An image forming apparatus incorporates the aforementioned belt driving apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

Embodiments of the present invention will be described with reference to the accompanying drawings. By way of example, an image forming apparatus will be described in terms of a color printer.

First Embodiment

Figure 1:
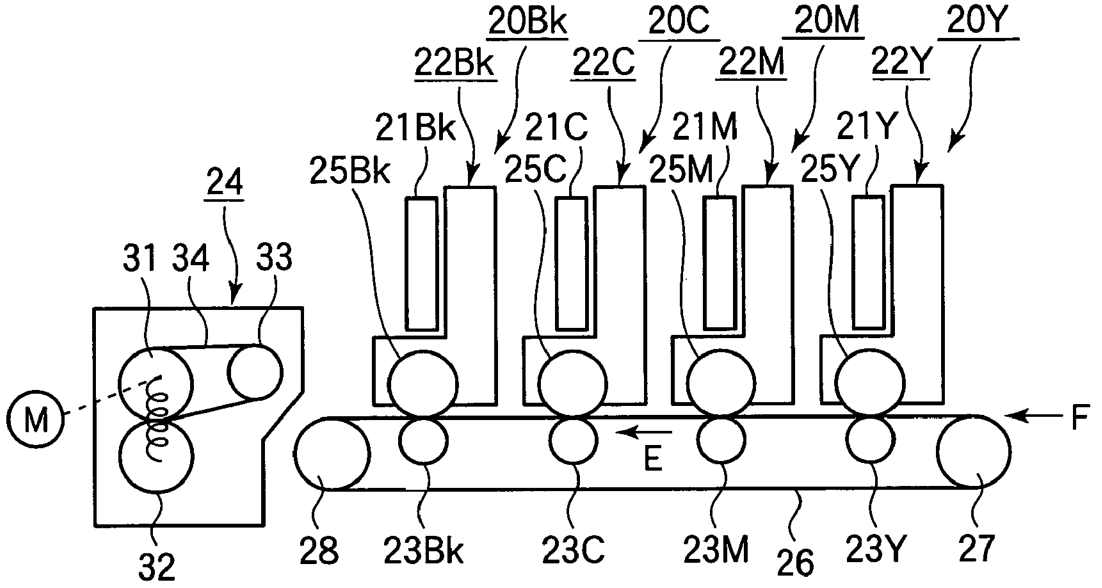
FIG. 1 is a schematic diagram of a printer.
Figure 2:
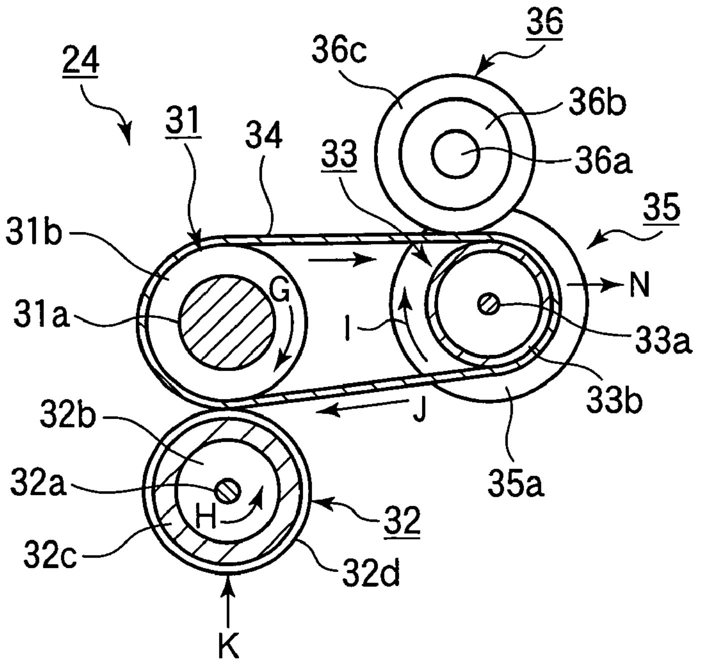
FIG. 2 is a side view illustrating a fixing unit according to the first embodiment.

FIG. 1 is a schematic diagram of a printer. FIG. 2 is a side view illustrating a fixing unit according to the first embodiment.

Referring to FIG. 1, image forming sections 20Y-20BK are aligned in a direction in which recording paper is advanced. The image forming sections 20Y-20BK are provided with developing units 22Y-22BK, photoconductive drums 25Y-25Bk, exposing units 21Y-21BK, and transfer rollers 23Y-23BK, respectively. The exposing units 21Y-21BK form electrostatic latent images of corresponding colors on the photoconductive drums 25Y-25BK. The developing units 22Y-22BK develop the electrostatic latent images with toners of corresponding colors into color toner images.

The transfer rollers 23Y-23BK are under the photoconductive drums 25Y-25BK with a belt 26 sandwiched between the transfer rollers 23-23BK and the photoconductive drums 25Y-25BK. The belt 26 is entrained about a drive roller 27 and a driven roller 28 and runs in a direction shown by arrow E. The paper is fed onto the belt from a paper-feeding unit, not shown. The belt 26 transports the paper through the image forming sections 20Y-20BK, so that the transfer rollers transfer the toner images of the corresponding colors onto the paper to form a full color toner image on the paper.

When the drive roller 27 is driven in rotation by a motor, not shown, the belt runs and the driven roller 28 also rotates.

The paper is advanced to a belt type fixing unit 24, which in turn fixes the color toner image into a permanent full color image. A fixing roller 31 is rotatable in a direction shown by arrow G. A pressure roller 32 is rotatable in a direction shown by arrow H. A heat roller 33 is rotatable in a direction shown by arrow I. An endless belt 34 is entrained about the fixing roller 31 and heat roller 33, and runs in a direction shown by arrow J. A motor M (FIG. 1) is provided for driving the belt 34. The motor M is coupled to at least one of the fixing roller 31, heat roller 33 and pressure roller 32. In the first embodiment, the motor M is coupled to the fixing roller 31. When the motor M rotates, the belt 34 runs and the pressure roller 32 and heat roller 33 rotate accordingly.

The pressure roller 32 and heat roller 33 have heat sources 32*a* and 33*a*, respectively. The heat sources 32*a* and 33*a* heat the pressure roller 32 and heat roller 33, which in turn heat the belt 34. The pressure roller 32 presses the fixing roller 31 via the belt 34 in a direction shown by arrow K. The heat roller 33 presses the belt 34 in a direction shown by arrow N.

The fixing roller 31 has an outer diameter of 30 mm. A resilient heat-insulating layer 31*b* in the form of silicone rubber is formed around a solid metal shaft 31*a*. The pressure roller 32 has an outer diameter of 30 mm. A resilient layer 32*c* in the form of silicone rubber is formed around the outer cylindrical surface of an aluminum or iron pipe 32*b*. A mold-releasing layer 32*d* is a fluorinated layer formed on the resilient heat-insulating layer 31*b* for improving the ability of the fixing roller 31 to release the toner. For heat roller 33 has an outer diameter of 24 mm and has an iron or aluminum hollow pipe 33*b*.

The belt 34 has an outer diameter of 60 mm when it is in the shape of a complete ring. The belt 34 has a three-layer of base layer, resilient layer, and mold releasing layer. The base layer is made of a metal such as stainless steal or nickel and has a thickness of about 0.04 mm. Alternatively, the base layer may be made of polyimide resin having a thickness of about 0.1 mm. The resilient layer is made of silicone rubber and has a thickness in the range of 0.15 to 0.3 mm. The mold releasing layer is a fluorinated layer so that the melted toner can be released easily from the mold layer.

In order to increase the fixing speed to improve printing speed, the nip formed between the belt 34 and the pressure roller 32 needs to be made larger. For this purpose, the resilient heat insulating layer 31*b* is formed on the fixing roller 31 and the resilient layer 32*c* is formed on the pressure roller 32. Because a full color toner image contains toner images of the respective colors and therefore the surface of the full color toner image is not smooth and flat but irregular. Thus, for uniformly pressing the color toner image, the belt 34 is provided with the aforementioned resilient layer.

If the belt runs crooked due to dimensional errors in various members, imbalance of tension applied to the belt, and non-uniform temperature distribution across the length of the fixing roller and heat roller, the edge portion of the belt 34 is damaged.

Figure 3:
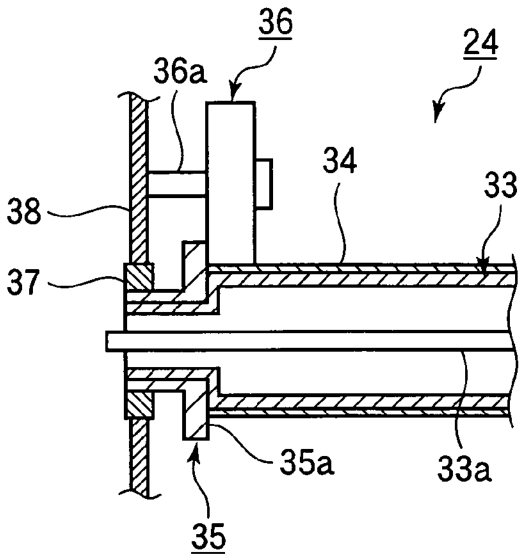
FIG. 3 illustrates a heat roller and a guide roller according to a first embodiment.

FIG. 3 illustrates a heat roller and a guide roller according to a first embodiment. Referring to FIG. 3, for preventing the belt 34 from shifting in an axis direction of the rollers, an annular sleeve 35 having a flange 35*a* is provided to at least one longitudinal end of the heat roller 33. In the first embodiment, the sleeve 35 is provided at both longitudinal ends of the heat roller 33 and extends radially. The sleeve 35 may have a sector shaped flange in place of the sleeve 35. The sleeve 35 has a radius larger than the sum of the radius of the heat roller 33 and the thickness of the belt 34, so that the sleeve 35 projects further than the belt 34 in the radial direction.

There is provided a guide roller 36 on at least one longitudinal end side of the heat roller 33. The guide roller 36 is rotatably supported on the supporting frame 38 and rotates in contact with the surface of the belt 34 and the sleeve 35. The heat roller 33 is supported by a bearing 37 which in turn is supported by the supporting frame 38.

Referring back to FIG. 2, the guide roller 36 is in contact with a flange 35*a* of the sleeve 35 and the belt 34 a position at which the belt 34 has run into wrapping contact with the heat roller 33. The guide roller 36 rotates as the belt 34 runs.

The guide roller 36 has a heat-resistant resin layer 36*b* formed on a shaft 36*a* so that the resin layer 36*b* will not damage the side surface of the flange 35 and the outer surface of the belt 34. A heat-resistant resilient layer 36*c* formed of, for example, silicone rubber is formed on the resin layer 36*b*. Thus the guide roller 36 can effectively resiliently press the outer surface of the belt 34. Alternatively, an additional resin layer may be formed on the heat-resistant layer 36*c*.

The operation of the printer of the aforementioned configuration will be described.

When a printing operation is initiated, the belt 34 runs in the J direction and may run crooked due to dimensional errors in various members that form the fixing unit 24, imbalance of tension applied to the belt 34, and non-uniform temperature distribution across the length of the fixing roller 31 and heat roller 33. At this moment, the edge portion of the belt 34 abuts the side surface of the sleeve 35, which in turn prevents the belt 34 from shifting any further.

The edge portion of the belt 34 moves into contact engagement with the sleeve 35 before the belt 34 wraps around the heat roller 33. As the sleeve 35 rotates, the frictional force between the sleeve 35 and the belt 34 creates a force that acts on the belt 34 in a radially outward direction.

Because the guide roller 36 contacts the outer surface of the belt 34 at a position where the belt 34 has wrapped around the heat roller by a small amount, and presses the edge portion of the belt 34 against the heat roller 33, the edge portion of the belt 34 is prevented from deforming radially outwardly of the heat roller 33. Thus, the belt 34 will be free from warping but wrap sufficiently around the heat roller 33 for reliable running.

Thus, the edge portion of the belt 34 will not run over the sleeve 35 or be damaged.

Second Embodiment

In order for a belt to run reliably, the force that causes the belt to shift one side needs to be minimized. A second embodiment is directed to minimizing the force that causes the belt to shift one side.

Figure 4:
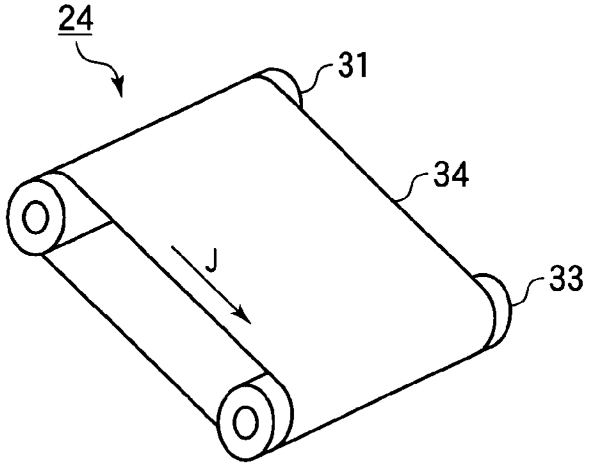
FIG. 4 is a perspective view of a belt, fixing roller, and heat roller when the belt runs normally.
Figure 5:
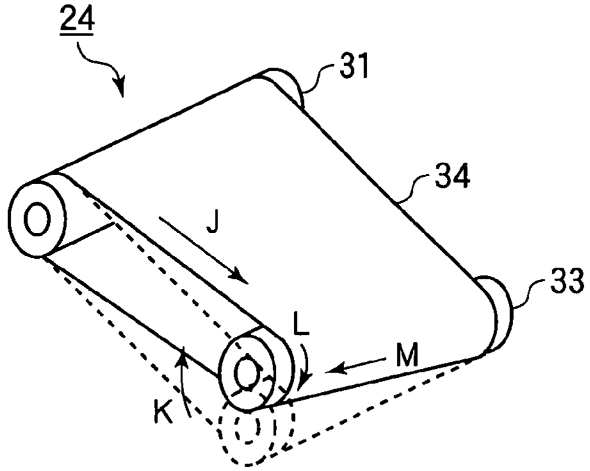
FIG. 5 is a perspective view of the belt, the fixing roller, and a heat roller when the belt shifts to one side.

FIG. 4 is a perspective view of a belt 34, the fixing roller 31, and a heat roller 33 when a belt 34 runs normally. FIG. 5 is a perspective view of the belt 34, the fixing roller 31, and a heat roller 33 when the belt 34 shifts to one side.

Referring to FIGS. 4 and 5, the fixing unit 24 unit 24 includes the fixing roller 31, pressure roller 32 (FIG. 1), heat roller 33, and an endless belt 34 entrained about the fixing roller 31 and heat roller 33 and running in a direction shown by arrow J.

When one longitudinal end of the heat roller 33 (left in FIG. 5) is pivoted upward about another longitudinal end in a direction shown by arrow K, a portion of the belt 34 running in the J direction reaches the heat roller 33 and further runs along the outer circumference of the heat roller 33. At this moment, the belt runs about the rotational axis of the heat roller 33 in a direction shown by arrow L, thereby wrapping around the heat roller 33. Therefore, the belt 34 tends to shift in a direction shown by arrow M. Contrary, if the another longitudinal end of the heat roller 33 (right in FIG. 5) is pivoted upward about the one longitudinal end, a portion of the belt 34 running in the J direction reaches the heat roller 33 and further runs along the outer circumference of the heat roller 33. Therefore, the belt 34 tends to shift in a direction shown by arrow M.

In this manner, causing the one longitudinal end of the heat roller 33 to pivot slightly about the other longitudinal end or vice versa, the belt 34 can be moved toward the one longitudinal end or the other, thereby minimizing the force that causes the belt to shift one side. This configuration allows the belt 34 to run reliably and increases reliability of the belt 34.

Third Embodiment

Elements similar to those in the first embodiment have been given the same reference numerals and the description is omitted.

Figure 6:
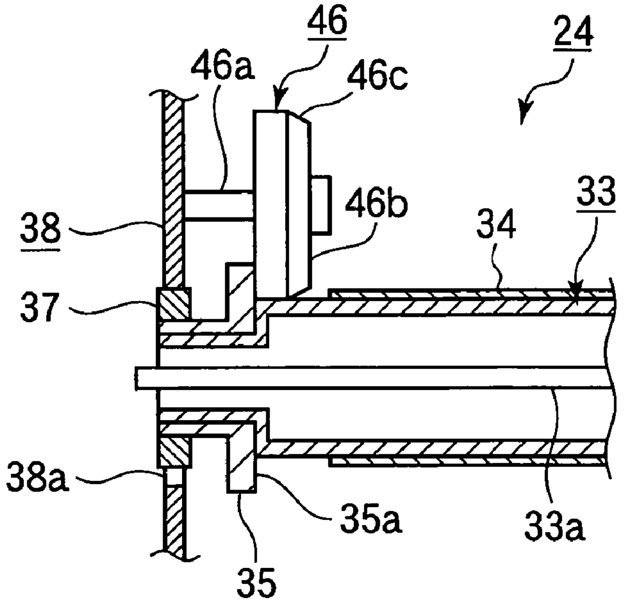
FIG. 6 and FIG. 7 are cross-sectional views of a guide roller according to a third embodiment.
Figure 7:
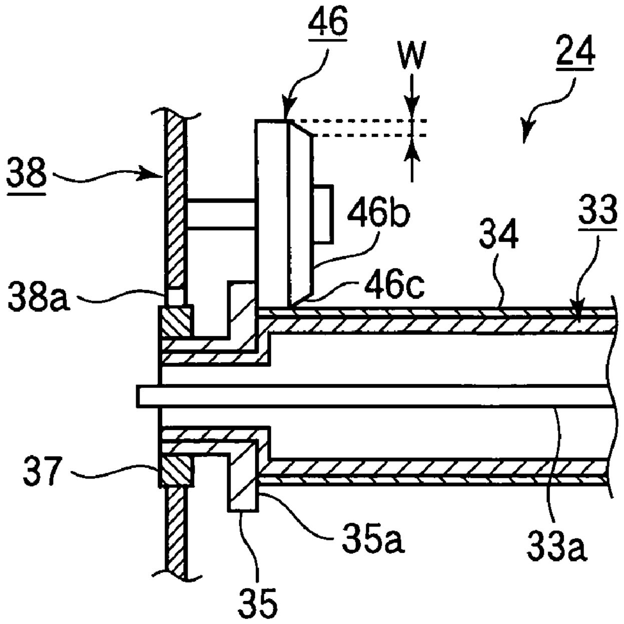
Figure 8:
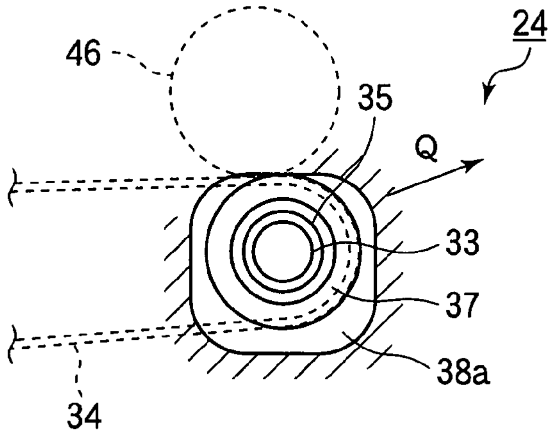
FIG. 8 illustrates a direction in which a force acts so that the heat roller applies tension to a belt.

FIG. 6 and FIG. 7 are cross-sectional views of a guide roller according to a third embodiment. FIG. 8 illustrates a direction in which a force acts so that the heat roller applies tension to a belt 34.

A bearing 37 is provided to at least one longitudinal end of the heat roller 33, and is disposed such that the heat roller 33 is somewhat movable within an opening 38*a* formed in the supporting frame 38 toward and away from the shaft 46*a*. When the bearing 37 is at an upper end of the opening 38*a*, there is a gap below the bearing 37 between the bearing 37 and the supporting frame 38 as shown in FIGS. 6 and 8. When the bearing 37 is at a lower end of the opening 38*a*, there is a gap above the bearing 37 between the bearing 37 and the supporting frame 38 as shown in FIG. 7.

There are provided guide rollers 46 near the both longitudinal ends of the heat roller 33 such that the guide rollers 46 extend from the supporting frame 38 inwardly to oppose each other. The guide rollers 46 rotate in contact with the longitudinal end portion of the heat roller 33 and the sleeve 35. The width of the belt 34 is shorter than the length of the heat roller 33 such that the edge portion of the belt 34 is not in contact with neither the sleeve 35 nor the guide rollers 46. The guide rollers 46 have a conical or tapered circumferential surface 46*c* such that the difference W between a large diameter and a small diameter of the tapered circumferential surface is larger than the thickness of the belt 34.

The heat roller 33 is urged by a spring 24*a* in a direction away from the fixing roller 31 (FIG. 1), i.e., in a direction shown by arrow Q in FIG. 8 so that the belt 34 has a predetermined tension therein. In this case, the spring applies a force that urges the bearing 37 upward.

The edge portion of the belt 34 will not contact the sleeve 35 so that the bearing 37 is positioned at an upper position with the outer circumferential surface of the guide roller 46 in contact with the circumferential surface of the heat roller 33.

The operation of the printer of the aforementioned configuration will be described.

When the edge portion of the belt 34 shifts toward a longitudinal end of the heat roller 33 as the belt 34 runs crooked, the edge portion moves into contact engagement with the tapered surface 46*c*. If the belt 34 further shifts, the edge portion of the belt 34 will be caught between the guide roller 46 and the circumferential surface of the heat roller 33. At this moment, the bearing 37 moves in a direction away from the guide roller 46. When the belt 34 is completely sandwiched between the guide roller 46 and the heat roller 33, the bearing 37 is at its lowest position as shown in FIG. 7.

As the bearing 37 moves downward, the heat roller 33 tilt in such a way that one longitudinal end of the heat roller 33 is lower than the other longitudinal end. Therefore, the belt 34 will shift to the opposite direction until the belt 34 reaches an equilibrium point at which the forces causing the belt 34 to shift are equal in magnitude and opposite in direction. In this manner, the edge portions of the belt 34 are not damaged.

Fourth Embodiment

Elements similar to those in the third embodiment have been given the same reference numerals and the description thereof is omitted.

Figure 9:
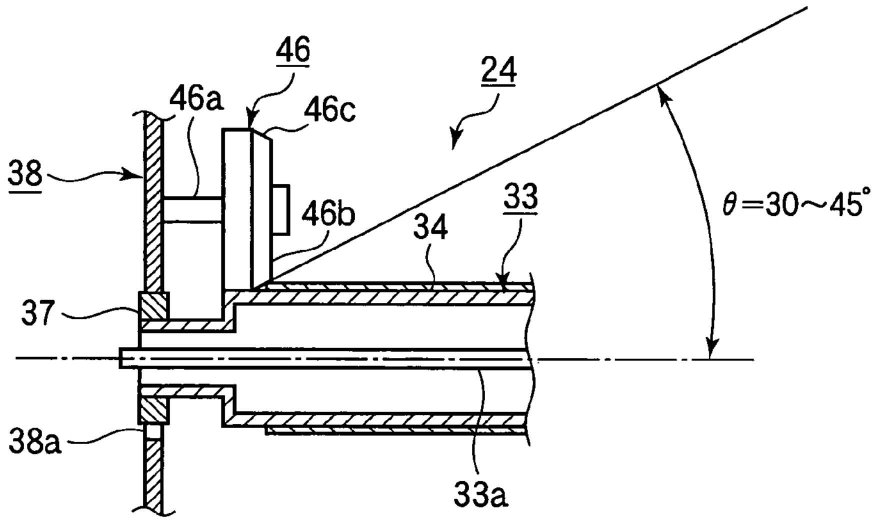
FIG. 9 illustrates a heat roller and a guide roller according to a fourth embodiment.

FIG. 9 illustrates a heat roller and a guide roller according to a fourth embodiment.

It is to be noted that there is not provided a flange such as the sleeve 35 in the third embodiment. This will be described later. The thickness of a belt 34 is selected to be larger than 0.3 mm and preferably in the range of 0.5 to 1.0 mm. The thickness of the belt 34 according to the fourth embodiment is larger than that of the belt 34 according to the third embodiment.

When the belt 34 is caught between a heat roller 33 and a tapered surface 46*c* of a guide roller 46, a bearing 37 at one end of the heat roller 33 moves away from the guide roller 46 so that the heat roller 33 will tilt slightly. As a result, a force is developed which causes the belt 34 to shift the belt 34 in the opposite direction. The larger the inclination of the heat roller 33 become, larger the shifting of the belt 34 is. Thus, the belt 34 will shift to the opposite direction until the belt 34 reaches an equilibrium point at which the forces causing the belt 34 to shift are equal in magnitude and opposite in direction. In this manner, the edge portions of the belt 34 are not damaged.

In the fourth embodiment, the belt 34 will reach an equilibrium point at which the forces causing the belt 34 to shift are equal in magnitude and opposite in direction, before the edge portion of the belt 34 has been completely caught between the guide roller 46 and the heat roller 33. For this purpose, the inclination angle θ of a tapered surface 46*c* with respect to the rotational axis of the guide roller 46 is selected to be in the rage of 30 to 45 degrees so as to depress the heat roller 33 when the heat roller 33 moves in its longitudinal direction.

Because the belt 34 will reach the equilibrium point before the edge portion of the belt 34 has been completely caught between the guide roller 46 and the heat roller 33, a flange such as the sleeve 35 in the third embodiment need not be provided at longitudinal ends of the heat roller 33.

Fifth Embodiment

Elements similar to those in the fourth embodiment have been given the same reference numerals and the description thereof is omitted.

Figure 10:
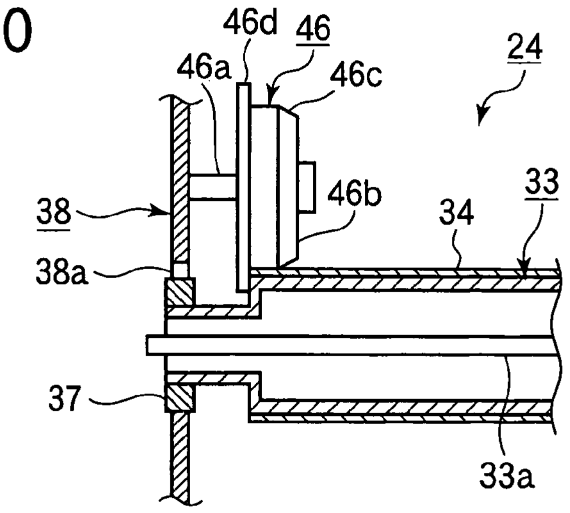
FIG. 10 illustrates a heat roller and a guide roller according to a fifth embodiment.
Figure 11:
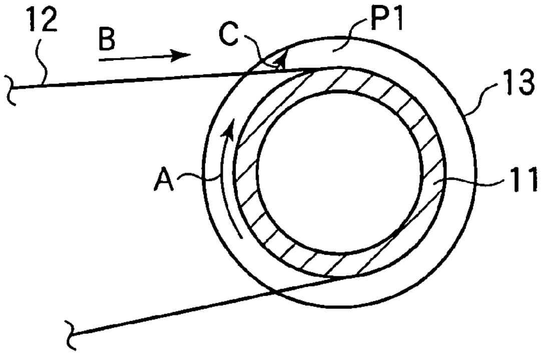
FIG.11 CONVENTIONAL ART
FIG. 11 illustrates a conventional belt.
Figure 12:
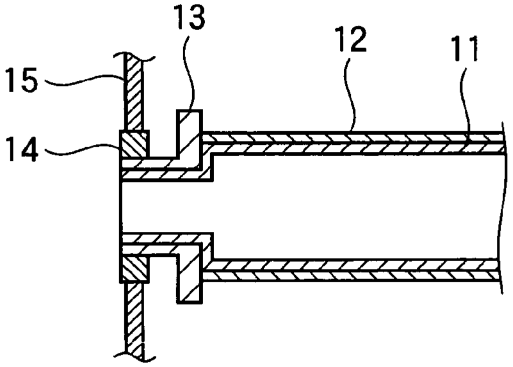
FIG.12 CONVENTIONAL ART
FIG. 12 and FIG. 13 illustrate how a belt shifts to one side.
Figure 13:
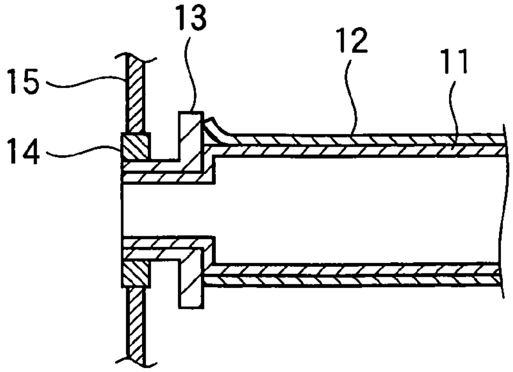
FIG.13 CONVENTIONAL ART

FIG. 10 illustrates a heat roller 33 and a guide roller 46 according to a fifth embodiment.

The guide rollers 46 are provided on longitudinal end portions of the heat roller 33 in such a way that the guide rollers 46 extend inwardly to oppose each other. The guide roller 46 is formed in one piece with a flange 46*d* having a larger diameter than the guide roller 46. As shown in FIG. 10, the guide roller 46 is disposed such that the flat peripheral surface of the flange 46*d* rotates in contact with the longitudinal end of the heat roller 33 and the guide roller 46 rotates in contact with the circumferential surface of the belt 34. Even when the belt 34 shifts further after the belt 34 has been completely caught between the guide roller 46 and heat roller 33, the edge portion of the belt 34 abuts the flange 46*d*, which in turn prevents the belt 34 from shifting any further.

While the aforementioned embodiments have been described in terms of the belt 34 in the fixing unit 24, the invention may also be applied to the belt 26 that transports the recording paper.

While the aforementioned embodiments have been described with respect to the belt 34 entrained about two rollers, the invention may also be applied to a belt entrained about more than two rollers.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A belt driving apparatus comprising:

a plurality of rollers;

a belt entrained about said plurality of rollers;

a drive source that is coupled to at least one of said plurality of rollers, said drive source driving the at least one of said plurality of rollers in rotation;

a first restriction member provided in a vicinity of at least one longitudinal end portion of at least one of said plurality of rollers, said first restriction member contacting a widthwise edge of said belt, so that said belt is prevented from moving outwardly in a longitudinal direction of the at least one of said plurality of rollers; and a second restriction member provided in the vicinity of the at least one longitudinal end portion of the at least one of said plurality of rollers, said second restriction member cooperating with an outer circumferential surface of the at least one of said plurality of rollers to hold said belt between said second restriction member and the at least one of said plurality of rollers in superimposed relation, so that said belt is prevented from moving outwardly in a radial direction of the at least one of said plurality of rollers.

2. The belt driving apparatus according to claim 1, wherein said second restriction member includes:

a shaft;

a resin layer that covers said shaft; and a heat-resistant resilient layer that covers said resin layer.

3. The belt driving apparatus according to claim 1, wherein said belt has a three-layer structure consisting of a base layer, a resilient layer, and a mold releasing layer which are layered in this order from an inner layer of said belt to an outer layer of said belt.

4. An image forming apparatus incorporating said belt driving apparatus according to claim 1.

5. The belt driving apparatus according to claim 1, wherein said first restriction member extends radially outwardly from the at least one of said plurality of rollers.

6. The belt driving apparatus according to claim 1, further comprising a supporting member that supports the at least one of said plurality of rollers, wherein said second restriction member is fixed to the supporting member.

7. The belt driving apparatus according to claim 1, wherein said first restriction member is a flange.

8. The belt driving apparatus according to claim 1, wherein said second restriction member is a rotating member.

9. The belt driving apparatus according to claim 1, wherein said second restriction member includes at least a resin layer.

10. A belt driving apparatus comprising:

a plurality of rollers;

a belt entrained about said plurality of rollers;

a drive source that is coupled to at least one of said plurality of rollers, said drive source driving the at least one of said plurality of rollers in rotation;

a restriction member provided in a vicinity of at least one longitudinal end portion of at least one of said plurality of rollers, said restriction member preventing said belt from moving outwardly in a longitudinal direction of the at least one of said plurality of rollers and preventing said belt from moving outwardly in a radial direction of the at least one of said plurality of rollers, wherein said restriction member includes:

a flange that is provided at the at least one end portion of the at least one of said plurality of rollers and projects in a radial direction from the at least one of said plurality of rollers;

a rotating member that is supported to roll on an outer surface portion of said belt in a vicinity of said flange and presses the outer surface portion against a circumferential surface of the at least one of said plurality of rollers; and a stationary supporting member that supports the at least one end portion of the at least one of said plurality of rollers such that the at least one end portion of the at least one of said plurality of rollers is movable toward and away from said rotating member;

wherein said rotating member is formed with a tapered circumferential surface conical with respect to a rotational axis of said rotating member, the tapered circumferential surface being tapered toward a longitudinally middle portion of the at least one of said plurality of rollers, wherein the tapered circumferential surface is such that a difference between a large diameter and a small diameter of the tapered circumferential surface is larger than a thickness of said belt, and wherein said stationary supporting member includes an opening in which the at least one end portion is movable toward and away from said rotating member as said belt moves in the longitudinal direction.

11. The belt driving apparatus according to claim 10, wherein said rotating member includes a cylinder portion rolling on the outer surface portion of said belt.

12. The belt driving apparatus according to claim 11, further comprising an urging member that urges the at least one end portion of the at least one of said plurality of rollers toward said rotating member.

13. A belt driving apparatus comprising:

a belt;

a plurality of rollers about which said belt is entrained, at least one of said plurality of rollers being supported such that the at least one of said plurality of rollers is movable in accordance with movement of the belt in a longitudinal direction of the at least one of said plurality of rollers;

a drive source coupled to at least one of said plurality of rollers, said drive source driving the at least one of said plurality of rollers in rotation;

an abutment member provided in a vicinity of at least one longitudinal end portion of at least one of said plurality of rollers and preventing said belt from moving outwardly in a radial direction of the at least one of said plurality of rollers, wherein said abutment member includes a first surface in rolling contact with an outer circumferential surface of the at least one of said plurality of rollers and a second surface extending toward a longitudinally middle portion of the at least one of said plurality of rollers, the first surface being an outer circumferential surface of said abutment member, the second surface forming an angle with a rotational axis of the at least one of said plurality of rollers; and a stationary supporting member that supports the at least one end portion of the at least one of said plurality of rollers such that the at least one end portion of the at least one of said plurality of rollers is movable toward and away from said abutment member, and wherein said stationary supporting member includes an opening in which the at least one end portion is movable toward and away from said abutment member as said belt moves in the longitudinal direction.

14. The belt driving apparatus according to claim 13, wherein the angle is in the range of 30 to 45 degrees.

15. The belt driving apparatus according to claim 13, wherein said belt has a thickness in the range of 0.3 to 1.0 mm.

16. The belt driving apparatus according to claim 13, wherein said belt has a thickness in the range of 0.5 to 1.0 mm.

17. The belt driving apparatus according to claim 13, wherein said abutment member is a rotating member, and includes a flange that projects radially outwardly from the rotating member and rotates in contact with an end surface of the at least one of said plurality of rollers.

18. The belt driving apparatus according to claim 13, wherein:

said abutment member is in a shape of a cylinder; and the second surface is a conical surface contiguous with the first surface, so that a difference between a large diameter and a small diameter of the conical surface is larger than a thickness of said belt.

19. The belt driving apparatus according to claim 13, further comprising a restriction member disposed in the vicinity of the at least one longitudinal end portion of the at least one of said plurality of rollers, said restriction member restricting said belt from moving outwardly in the longitudinal direction of the at least one of said plurality of rollers.

20. The belt driving apparatus according to claim 19, wherein said restriction member projects outwardly in a radial direction of the at least one of said plurality of rollers.

21. The belt driving apparatus according to claim 13, wherein the at least one end portion of the at least one of said plurality of rollers is rotatably received in a space formed in the stationary supporting member, such that the at least one end portion is movable within the space relative to said rotating member.

22. An image forming apparatus incorporating said belt driving apparatus according to claim 13.

23. The belt driving apparatus according to claim 13, further comprising an urging member that urges the at least one end portion of the at least one of said plurality of rollers toward said rotating member.

* * * * *